8840X
G. EYLES.
SPIRIT LAMP.
Patented May 22, 1835.
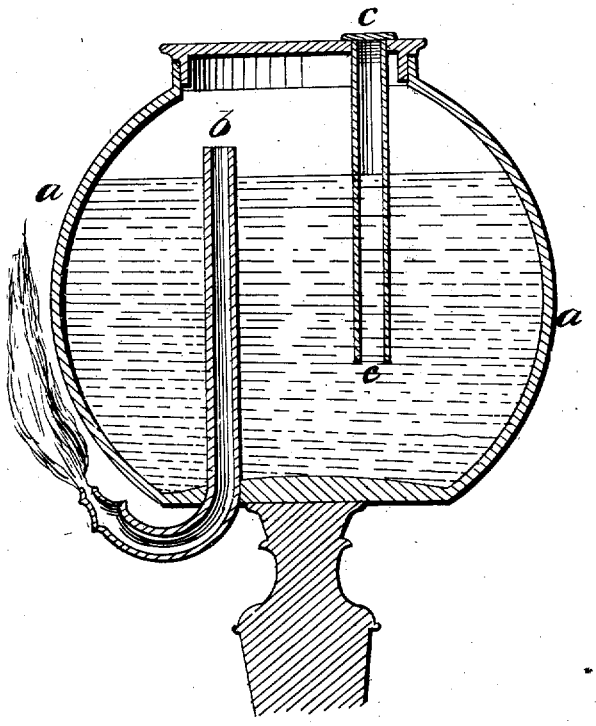
THE NORRIS PETERS CO., PHOTO-LITHO., WASHINGTON, D. C.

May 22 1835 8840X

George Eyles of Boston State of Massachusetts.

Letters Patent.

The schedule referred to in these Letters Patent and making part of the same containing a description in the words of the said George Eyles himself of his Improvement in the lamp, for burning Volatile Materials To all whom it may concern;

Be it known that I George Eyles of the City of Boston in the State of Massachusetts, have invented an improvement in the lamp for burning Volatile materials in the manner of what is sometimes called the spirit gas lamp. And that the following is a full and exact description thereof.

This Lamp may be variously modified according to the purpose to which it is to be applied, or the taste of the manufacturer and in the drawings deposited in the Patent office. I have exhibited various modifications thereof which it is not necessary here to describe as the principle will be perfectly well understood by a specification of one of them. The body of the lamp, which is to contain the combustible ingredient may be of a globular form, and either suspended or placed upon a stand, and it may have any desired number of Jets or burners. The flame is to issue from the lower part of the lamp, in order that it may communicate sufficient heat thereto to evaporate the fluid and keep up the combustion. The tube or jet through which it issues has an open end within the lamp, above the fluid to allow the vapour to enter it, and it may descend either within, or on the outside of the body of the lamp, to its point of escape.

To fill the Lamp. I insert a supply tube at or near the upper part thereof which descends nearly to the bottom, thus allowing the fluid to be poured in, without danger of the escape of the vapour. Where a single jet only is used it is of importance to be able to regulate the position of the tube, or of the lamp, as by this means the intensity of the combustion may be readily governed; the size of the jet also must be such as is adapted to the flame required. In order to light the lamp in the first instance it must be warmed sufficiently to convert a portion of the fluid into vapour after which it will keep up its own supply.

What I claim as my invention is the construction of a Lamp for burning

[illegible]

8840X volatile impediments substantially upon the principle or in the manner herein set forth, with all the variations of which the same is susceptible whilst a similar result is obtained by analogous means.

Witnesses
Robt. Clarke
Wm. Pierce

George Egley.

Ex.
Ch. W.

H95 2d